US012152397B2

(12) United States Patent
Elkins et al.

(10) Patent No.: US 12,152,397 B2
(45) Date of Patent: Nov. 26, 2024

(54) OUTDOOR SEISMIC EQUIPMENT ENCLOSURES

(71) Applicant: Vertiv Corporation, Columbus, OH (US)

(72) Inventors: Jin Harrison Elkins, Auburn, AL (US); Jerome Andrew Maloney, Sugar Grove, IL (US); Matthew Allan Podemski, Auburn, AL (US)

(73) Assignee: Vertiv Corporation, Westerville, OH (US)

( * ) Notice: Subject to any disclaimer, the term of this patent is extended or adjusted under 35 U.S.C. 154(b) by 152 days.

(21) Appl. No.: 17/749,528

(22) Filed: May 20, 2022

(65) Prior Publication Data

US 2022/0381051 A1 Dec. 1, 2022

Related U.S. Application Data

(60) Provisional application No. 63/192,764, filed on May 25, 2021.

(51) Int. Cl.
*E04H 1/12* (2006.01)
*E04H 9/02* (2006.01)

(52) U.S. Cl.
CPC ........... *E04H 1/1238* (2013.01); *E04H 9/024* (2013.01)

(58) Field of Classification Search
CPC ......... E04H 9/02; E04H 9/028; E04H 9/0237; E04H 1/1238; E04H 9/024; A47B 47/028; A47B 47/021

USPC ....... 211/26, 204, 206; 52/167.1; 312/265.1; 248/507, 638

See application file for complete search history.

(56) References Cited

U.S. PATENT DOCUMENTS

| 2,920,244 | A | * | 1/1960 | Miksit | H05K 7/14 248/441.1 |
| 4,493,422 | A | * | 1/1985 | Kaegebein | B25H 3/04 211/85.18 |
| 4,715,502 | A | * | 12/1987 | Salmon | H04Q 1/09 211/175 |
| 4,899,892 | A | * | 2/1990 | Rheault | H02B 1/54 211/72 |
| 5,004,107 | A | * | 4/1991 | Sevier | A47B 55/00 211/26 |
| 5,233,129 | A | * | 8/1993 | Hall | H05K 7/18 174/373 |
| 5,284,254 | A | * | 2/1994 | Rinderer | H05K 7/186 361/810 |
| 5,383,723 | A | * | 1/1995 | Meyer | H02B 1/54 52/655.1 |

(Continued)

*Primary Examiner* — Jennifer E. Novosad

(57) ABSTRACT

An outdoor seismic cabinet assembly includes a base located at an outdoor deployment location and a cabinet for housing electronic equipment coupled to the base. The assembly also includes a first post disposed adjacent to a first sidewall of the cabinet and coupled to the base, a second post disposed adjacent to a second sidewall of the cabinet and coupled to the base, and a cross-member disposed adjacent to a top portion of the cabinet. At least one first bracket is coupled to the first post and to the cross-member and at least one second bracket is coupled to the second post and to the cross-member. Other example outdoor seismic cabinet assemblies and seismic cabinet conversion kits are also disclosed.

10 Claims, 12 Drawing Sheets

(56) References Cited

U.S. PATENT DOCUMENTS

| | | | | |
|---|---|---|---|---|
| 5,540,339 | A * | 7/1996 | Lerman | E05D 15/502 312/324 |
| 5,566,836 | A * | 10/1996 | Lerman | H04Q 1/04 361/825 |
| 5,889,648 | A * | 3/1999 | Heavirland | H02B 1/32 174/559 |
| 5,979,672 | A * | 11/1999 | Gemra | H04Q 1/025 211/189 |
| 5,983,590 | A * | 11/1999 | Serban | H02B 1/01 52/656.1 |
| 6,179,133 | B1 * | 1/2001 | Reece | H02B 1/54 361/829 |
| 6,202,570 | B1 * | 3/2001 | Kurtsman | H04Q 1/08 211/187 |
| 6,220,456 | B1 * | 4/2001 | Jensen | H05K 7/1418 361/829 |
| 6,293,637 | B1 * | 9/2001 | Anderson | H02B 1/54 312/265.4 |
| 6,349,837 | B1 * | 2/2002 | Serban | H05K 7/183 361/829 |
| 6,478,166 | B2 * | 11/2002 | Hung | H05K 7/183 211/175 |
| 6,481,582 | B1 * | 11/2002 | Rinderer | H05K 7/183 361/679.02 |
| 6,482,541 | B1 * | 11/2002 | Bator, Jr. | H01M 50/224 429/96 |
| 6,605,777 | B1 * | 8/2003 | Anderson | H02B 1/301 312/265.4 |
| 6,719,150 | B2 * | 4/2004 | Marraffa | H01M 50/264 211/49.1 |
| 6,889,853 | B2 * | 5/2005 | Hudz | H05K 7/186 211/26 |
| 6,951,288 | B2 * | 10/2005 | Henderson | H05K 7/183 361/829 |
| 7,017,760 | B2 * | 3/2006 | Zuclich | H05K 7/18 211/187 |
| 7,219,809 | B2 * | 5/2007 | Schluter | H05K 7/186 211/189 |
| 7,275,646 | B2 * | 10/2007 | Mimlitch, III | H05K 7/186 403/167 |
| 7,874,433 | B2 * | 1/2011 | Levesque | H05K 7/1425 211/26 |
| 8,424,691 | B2 * | 4/2013 | McMillan, III | H04Q 1/03 361/826 |
| 8,833,711 | B2 * | 9/2014 | Fritz | A47B 95/00 312/265.5 |
| 9,066,585 | B2 * | 6/2015 | Kirby | A47B 57/44 |
| 11,792,953 | B2 * | 10/2023 | Chehade | H05K 7/18 211/26 |
| 2003/0116513 | A1 * | 6/2003 | Hudz | H05K 7/186 211/26 |
| 2004/0069725 | A1 * | 4/2004 | Adducci | H04Q 1/062 211/26 |
| 2004/0079714 | A1 * | 4/2004 | Andrew | H01M 50/209 211/49.1 |
| 2005/0084748 | A1 * | 4/2005 | Miller | H01M 10/6557 211/13.1 |
| 2006/0243680 | A1 * | 11/2006 | Levesque | H05K 7/1425 211/26 |
| 2012/0090869 | A1 * | 4/2012 | Bumeder | H02B 1/54 174/50 |
| 2012/0145655 | A1 * | 6/2012 | McMillan, III | H04Q 1/09 211/26 |
| 2022/0381051 | A1 * | 12/2022 | Elkins | H01M 50/207 |
| 2023/0128822 | A1 * | 4/2023 | Sy | F16B 7/18 211/26 |

* cited by examiner

OUTDOOR SEISMIC EQUIPMENT ENCLOSURES

RELATED APPLICATION

This application claims the benefit of U.S. Provisional Application No. 63/192,764 filed on May 25, 2021, which is incorporated herein by reference in its entirety.

FIELD

The present disclosure relates to outdoor seismic equipment enclosures, and in particular, seismic frames for outdoor electronic equipment enclosures and/or outdoor battery enclosures.

BACKGROUND

This section provides background information related to the present disclosure which is not necessarily prior art.

Enclosures such as cabinets are often used to contain, hold, and/or house electronic equipment and/or batteries. Some of these cabinets may be deployed outdoors. Depending on the seismic zone in which the cabinets are deployed, the cabinets may be constructed to meet different requirements corresponding to the seismic activity in the deployment location. For example, a cabinet that is deployed in a location with high seismic activity (e.g., areas near an active fault line) may be constructed with greater protections against earthquakes, heavy vibration, etc. to satisfy the seismic requirements for that location.

SUMMARY

This section provides a general summary of the disclosure, and is not a comprehensive disclosure of its full scope or all of its features.

According to one aspect of the present disclosure, an outdoor seismic cabinet assembly includes a base located at an outdoor deployment location and a cabinet for housing electronic equipment that is coupled to the base. The cabinet includes sidewalls (e.g., a first sidewall, a second sidewall) and a top portion. The assembly also includes posts (e.g., a first post, a second post) disposed adjacent to the sidewalls of the cabinet (e.g., the first and second sidewalls, respectively). Each post includes a first end, a second end, and at least one mounting surface, and the first end of each post is coupled to the base. Additionally, the at least one mounting surface of each post includes at least one connection point disposed at the second end of the post. Further, the assembly includes a cross-member disposed adjacent to the top portion of the cabinet. The cross-member includes a first end, a second end, and at least one mounting surface, with at least one first connection point disposed on the mounting surface at the first end of the cross-member and at least one second connection point disposed on the mounting surface at the second end of the cross-member. Brackets are coupled to the posts at the at least one connection point of each post. The brackets are also coupled to the cross-member (e.g., at the first and second connection points). A mounting surface of each bracket faces the mounting surface of the post to which the bracket is coupled as well as the mounting surface of the cross-member.

According to another aspect of the present disclosure, an outdoor seismic cabinet assembly includes a base located at an outdoor deployment location and a cabinet for housing electronic equipment coupled to the base. The cabinet includes a first sidewall and a second sidewall, where each sidewall includes a plurality of vertically-spaced connection points. The assembly also includes a first post including a first end, a second end, and a mounting surface. The first end of the first post is coupled to the base, and the mounting surface of the first post includes a plurality of connection points disposed vertically along a length of the first post. The plurality of connection points of the first post are coupled to the plurality of vertically-spaced connection points of the first sidewall of the cabinet. The assembly also includes a second post including a first end, a second end, and a mounting surface. The first end of the second post is coupled to the base, and the mounting surface of the second post includes a plurality of connection points disposed vertically along a length of the second post. The plurality of connection points of the second post are coupled to the plurality of vertically-spaced connection points of the second sidewall of the cabinet.

According to a further aspect of the present disclosure, a seismic conversion kit for an outdoor electronic equipment cabinet includes a first post having a first end and a second end. The first post includes at least one connection point positioned towards the first end of the first post and a mount plate coupled to the second end of the first post, where the mount plate is configured to secure the first post to a base. The kit also includes a second post having a first end and a second end. The second post includes at least one connection point positioned towards the first end of the second post and a mount plate coupled to the second end of the second post, where the mount plate is configured to secure the second post to the base. The kit further includes a cross-member including at least one first connection point positioned towards a first end of the cross-member and at least one second connection point positioned towards a second end of the cross-member. Moreover, the kit includes at least one first bracket including a plurality of connection points corresponding to the at least one connection point of the first post and the at least one first connection point of the cross-member, wherein the at least one first bracket is configured to couple the first post to the cross-member. The kit also includes at least one second bracket including a plurality of connection points corresponding to the at least one connection point of the second post and the at least one second connection point of the cross-member, wherein the at least one second bracket is configured to couple the second post to the cross-member.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
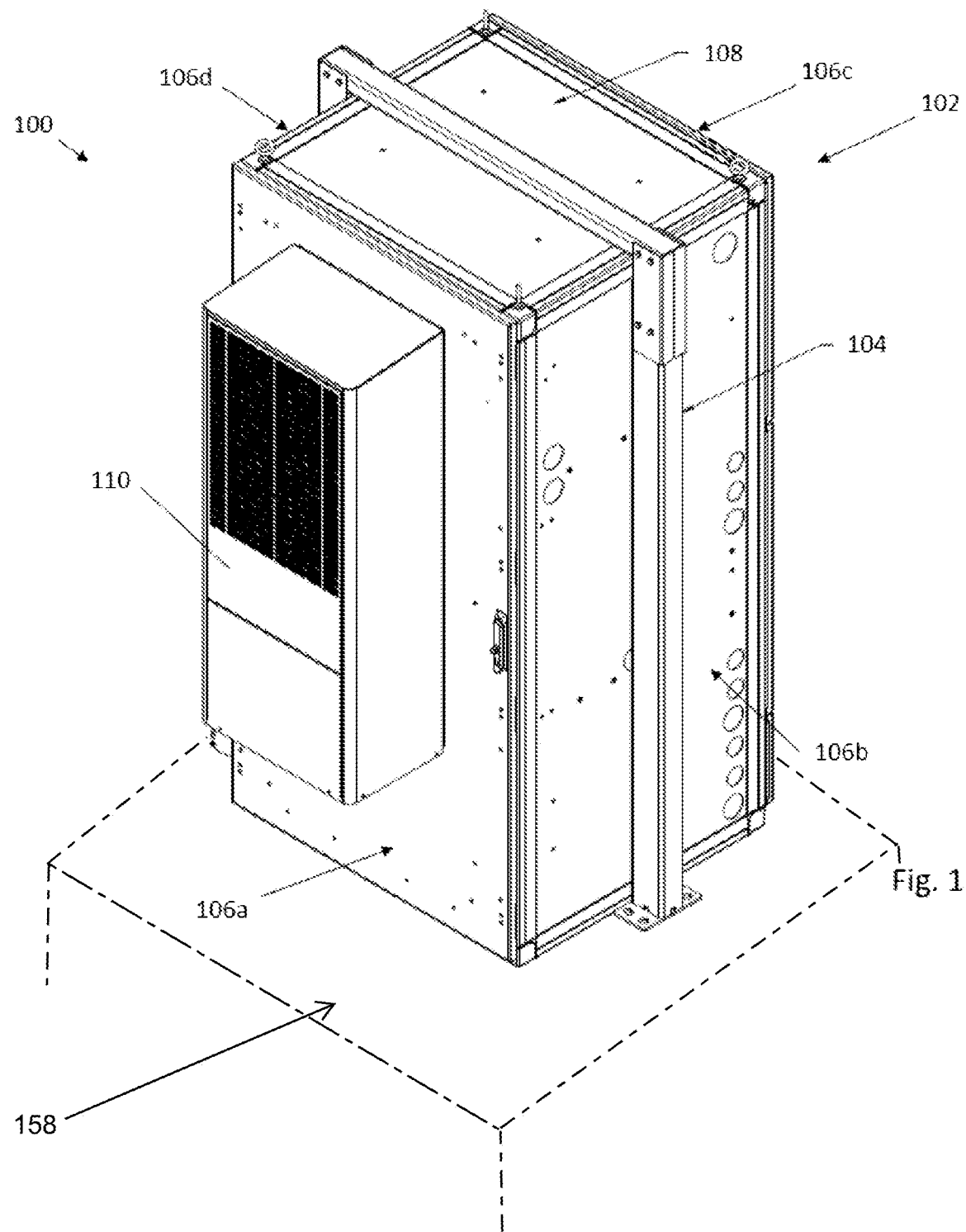
FIG. 1 is a perspective view of an example outdoor seismic cabinet assembly.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments of the present disclosure generally relate to equipment enclosures for electronics and/or batteries (broadly, cabinets) that are configured for deployment outdoors in locations with elevated seismic activity (e.g., seismic zone 4). In some aspects of the present disclosure, an outdoor equipment enclosure is converted, through the implementation of a seismic frame, from a lower seismic rating or capability (e.g., meeting GR-487 Zone 2 requirements) to a higher seismic rating (e.g., meeting GR-487 Zone 4 requirements) without requiring modification to the cabinet and/or its internal structure. For example, instead of having one enclosure specifically designed for a lower seismic rating and another enclosure specifically designed for a higher seismic rating, the seismic rating of an existing enclosure may be improved or increased by adding one or more seismic frames to the existing enclosure (e.g., at the location where the existing enclosure is already deployed outdoors in the field, etc.). As such, the seismic frames can be used, for example, as a field-installable cabinet conversion kit, to improve the seismic capability of an existing cabinet, without modifying the internal structure of the existing cabinet and without requiring different cabinets for different seismic zones.

Example embodiments will now be described more fully with reference to the accompanying drawings. The description and specific examples included herein are intended for purposes of illustration only and are not intended to limit the scope of the present disclosure.

FIGS. 1-8 illustrate an example embodiment of an assembly 100 including one or more aspects of the present disclosure. The assembly 100 includes a cabinet 102 (broadly, an enclosure) configured to house, store, hold, etc. electronic equipment and/or batteries (e.g., an electronic equipment cabinet, a battery cabinet, etc.) and a frame 104 (e.g., a seismic frame, etc.). The frame 104 is configured to at least partially surround the cabinet 102 and enables conversion of the seismic rating of the cabinet 102 from a lower seismic rating (e.g., without the frame 104) to a higher seismic rating (e.g., with the frame 104). In particular, when the cabinet 102 and the frame 104 are both coupled to a base 158, the frame 104 minimizes the vibrations experienced by the cabinet 102 and/or equipment (e.g., electronic equipment, batteries, etc.) within the cabinet 102, such that the cabinet 102 complies with GR-487 Seismic Zone 4 requirements.

Figure 2:
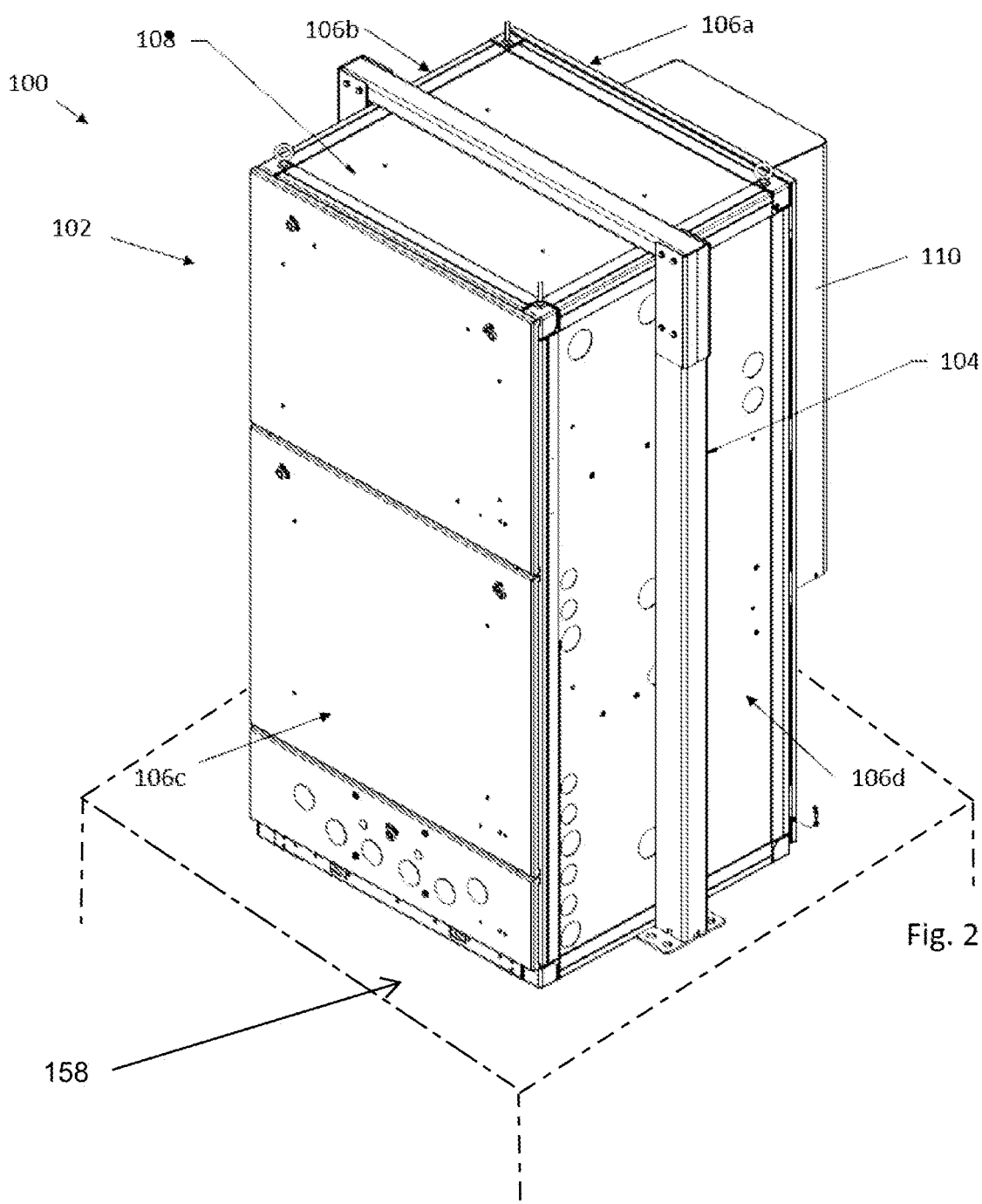
FIG. 2 is another perspective view of the assembly of FIG. 1.

As shown in FIGS. 1 and 2, the cabinet 102, in this embodiment, generally includes a box or cube shape having four sidewall sections 106a, 106b, 106c, and 106d (or sidewalls), and an upper (or top) portion 108. Although not shown, in some embodiments, the cabinet 102 includes electronic equipment and/or batteries within the cabinet 102, for example, within one or more compartments defined by the sidewall sections 106a, 106b, 106c, and 106d of the cabinet 102. It should be appreciated that the sidewall sections 106a, 106b, 106c, and 106d of the cabinet 102 may be formed from any suitable material within the scope of the present disclosure including, for example, metal such as steel or aluminum, rigid plastic, combinations thereof, etc. In addition, the cabinet 102 may include other shapes and/or configurations within the scope of the present disclosure, for example, having a greater or lesser number of sidewall sections, sidewall sections forming other than box shapes (e.g., round or cylindrical shapes having single sidewalls, polygonal shapes having multiple sidewalls, etc.), etc. In some embodiments, the cabinet 102 may be generally consistent with existing cabinet configurations such as any electronic equipment and/or battery cabinet already installed in the field (e.g., a 72" equipment cabinet, etc.).

In the illustrated embodiment, the cabinet 102 includes an air conditioner cooling system 110 to maintain the temperature within the cabinet 102, for example, at a temperature suitable for the electronic equipment and/or batteries included within the cabinet 102. In the illustrated embodiment, the air conditioner cooling system 110 is coupled to sidewall 106a of the cabinet 102. In some embodiments, depending on the components included within the cabinet 102 and/or the temperature requirements of the cabinet 102, cabinet 102 does not include the air conditioner cooling system 110.

Figure 3:
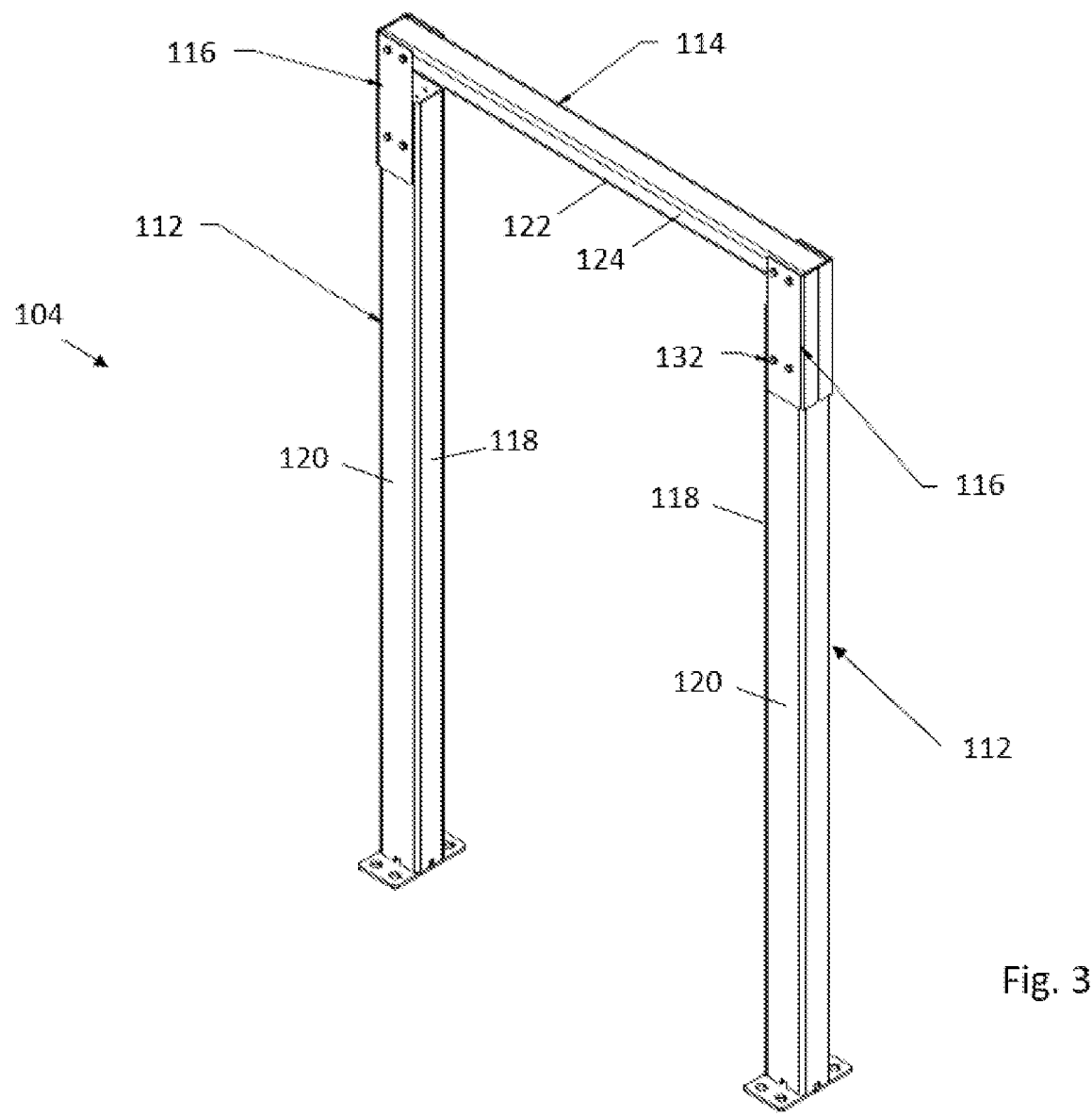
FIG. 3 is a perspective view of a frame included in the assembly of FIG. 1.

With additional reference to FIG. 3, the frame 104 generally includes a pair of posts 112, a cross-member 114, and brackets 116 to couple the cross-member 114 to the posts 112. As shown in the illustrated embodiment, the posts 112 (also referred to herein as vertical weldments) are positioned vertically and are disposed generally adjacent to sidewalls 106b, 106d of the cabinet 102. In other embodiments, the posts 112 may be positioned adjacent to other sidewalls of the cabinet 102 (e.g., 106a, 106c, etc.). In particular, a side 118 (e.g., a cabinet-facing side) (broadly, a first side) of each post 112 is positioned against the cabinet 102. In the illustrated embodiment, the first side 118 of the posts 112 are flush (e.g., substantially flush, etc.), or parallel, with the sidewalls 106b, 106d and are positioned external to the cabinet 102. In other embodiments, the first side 118 of the posts 112 may not contact or only partially contact the sidewalls 106b, 106d of the cabinet 102 (e.g., based on the configuration of the sidewalls 106b, 106d and/or cabinet 102). Additionally, each post 112 includes two mounting sides 120 (broadly, second sides) that are perpendicular to the first side 118. The brackets 116 are coupled (e.g., fastened) to the posts 112 on the mounting sides 120 of the posts 112. While two vertical posts 112 are shown in the illustrated embodiment, in other embodiments, a greater or lesser number of posts 112 positioned in the same or different orientation (e.g., vertical, angled, etc.) may be included in the frame 104 within the scope of the present disclosure.

As shown in the illustrated embodiment, the cross-member 114 is disposed generally above (e.g., adjacent to, etc.) the top portion 108 of the cabinet 102 in a horizontal configuration (e.g., perpendicular to the posts 112) and is external to the cabinet 102. Similar to the posts 112, the cross-member 114 includes a cabinet-facing side 122 and mounting sides 124. In particular, the cabinet-facing side 122 of the cross-member 114 is positioned to face the cabinet 102 and the cross-member 114 is coupled to the brackets 116 at the mounting sides 124. In some embodiments, the cabinet-facing side 122 of the cross-member 114 may or may not directly contact the top portion 108 of the cabinet 102 (e.g., depending on the configuration of the top portion 108, whether the top portion 108 includes additional features such as a structural roof cap and/or a solar shield, etc.). In the illustrated embodiment, the cabinet-facing side 122 of the cross-member 114 at least partially contacts the top portion 108 of the cabinet 102 and is substantially flush (e.g., parallel) with the top portion 108. It should be appreciated that a greater or lesser number of cross-members 114, positioned in a similar or different orientation, may be included in the frame 104 within the scope of the present disclosure.

In the illustrated embodiment, the posts 112 and the cross-member 114 are formed of (e.g., comprise) a structural steel rectangular tube. In particular, the posts 112 may be formed, for example, of a 4"×3"×0.120" thick structural steel rectangular tube with the length of the posts 112 sized to fit the height of a cabinet to which the frame 104 will be added (e.g., cabinet 102). And, the cross-member 114 may be formed, for example, of a 3"×2"×0.120" thick structural steel rectangular tube with the length if the cross-member 114 sized to fit the width of the cabinet to which the frame 104 will be added (e.g., cabinet 102). It should be appreciated that the posts 112 and the cross-member 114 of the frame 104 may be formed from any suitable material within the scope of the present disclosure in addition to structural steel including, for example, metals other than structural steel such as iron, high-strength plastic, combinations thereof, etc. Moreover, while posts 112 and cross-member 114 are formed from rectangular tubes in the illustrated embodiment, in other embodiments, the posts 112 and/or cross-member 114 may be formed in different configurations including, for example, c-channels, bars (e.g., solid bars), beams (e.g., I-beams, etc.), or the like.

Figure 4:
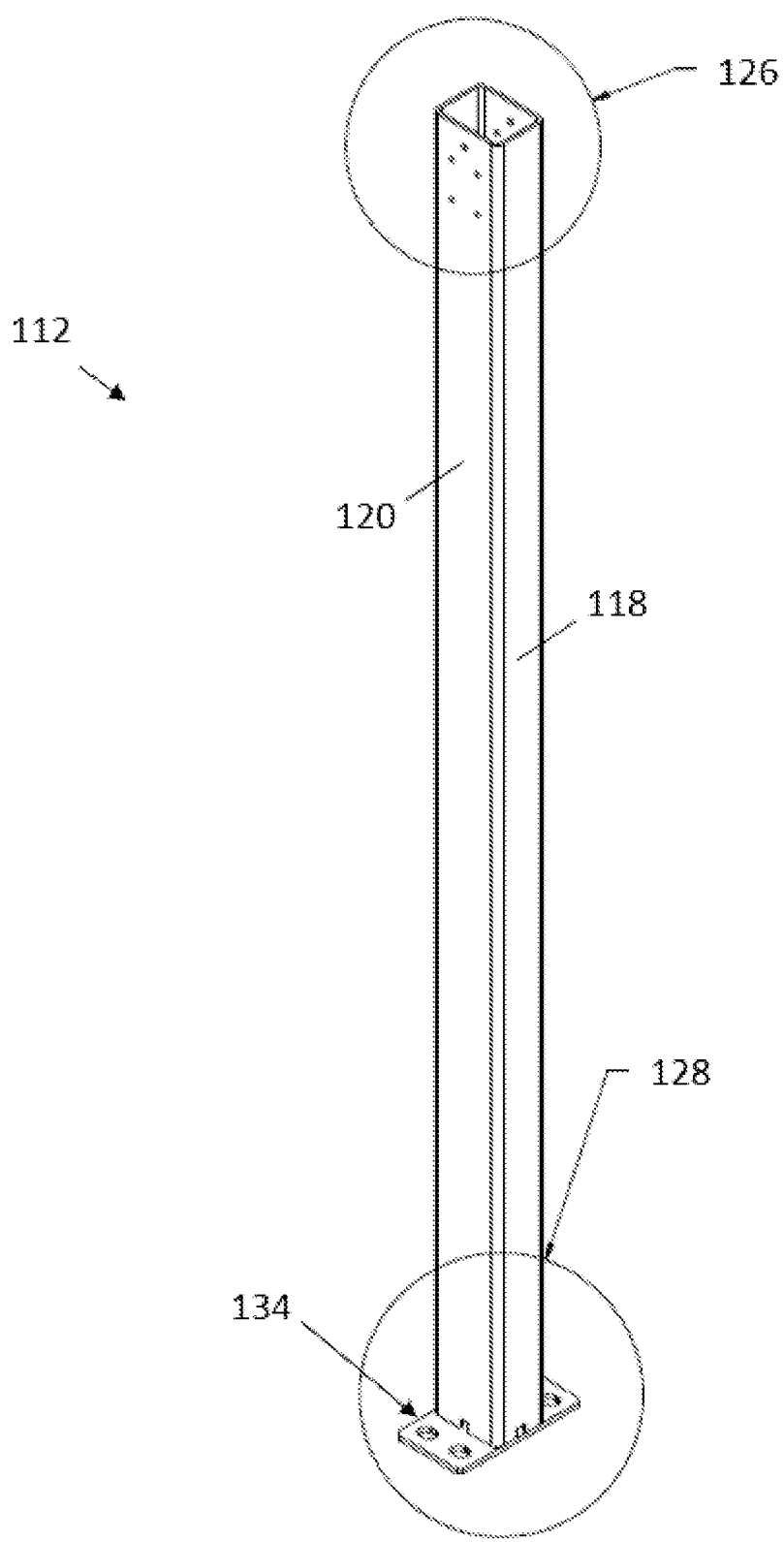
FIG. 4 is a perspective view of a post included in the frame of FIG. 3.
Figure 5A:
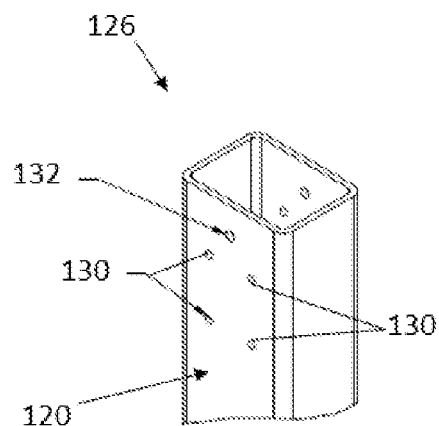
FIG. 5A is a perspective view of a first end of the post of FIG. 4.
Figure 5B:
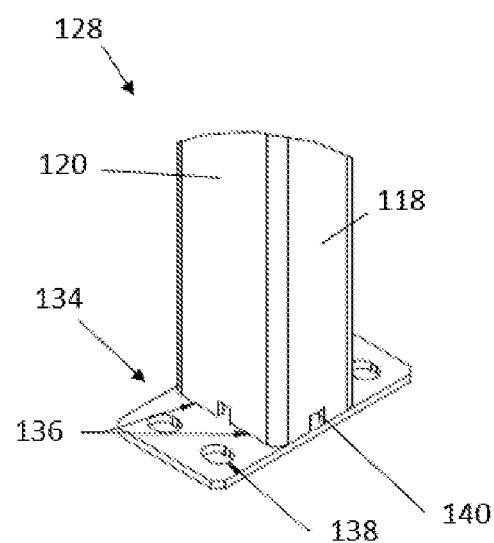
FIG. 5B is a perspective view of a first end of the post of FIG. 4.

With reference now to FIG. 4, each post 112 of the frame 104 includes a first end 126 and a second end 128. FIG. 5A illustrates the first end 126 of the post 112 in greater detail and FIG. 5B illustrates the second end 128 of the post 112 in greater detail. As shown in FIG. 5A, the first end 126 includes a plurality of connection points 130 on the mounting side 120 of the post 112 at which the bracket 116 may be coupled to the post 112. In the illustrated embodiment, the connection points 130 are configured as openings (e.g., tapped holes) which are suitable to receive fasteners 132 (e.g., ¼"-20 bolts, etc.). As shown, the post 112 includes two sets of connection points 130 (e.g., an upper pair of connection points 130 and a lower pair of connection points 130) which enables the overall height of the frame 104 to be adjusted. In particular, when the bracket 116 is coupled to the post 112 at the upper pair of connection points 130, the cross-member 114 (when coupled to the bracket 116) is positioned higher than when the bracket 116 is coupled at the lower pair of connection points 130. This adjustability provided by the multiple sets of connection points 130 allows the frame 104 to be used with cabinets of various heights as well as cabinets of a given height that may optionally include add-on features at the top of the cabinets (e.g., structural roof caps and/or solar shields, etc.). In some embodiments, the positioning of the connection points 130 on the first end 120 of the post 112 also enables a spacing to be created between the cross-member 114 and the posts 112 (e.g., such that the cross-member 114 and the posts 112 do not directly touch, etc.) (see FIG. 3). A greater or lesser number of connection points 130 (and/or a greater or lesser number of sets of connection points 130) may be included at the first end of each post 112, as desired, within the scope of the present disclosure.

The first end 126 of each post 112 further includes a paint line hole 132 positioned on each mounting side 120 of the post 112. In some embodiments, the paint line hole 132 can be used to hang the post 112 during paint operations such as painting operations performed during manufacturing. In the illustrated embodiment, the paint line hole 132 is positioned generally above the connection points 130 (i.e., towards the first end 126 of the post 112). It should be appreciated that the paint line hole 132 may be positioned on other sides of the post (e.g., the first side 118) and/or at different locations on the post 112, within the scope of the present disclosure.

The second end 122 of the post 112 is shown in FIG. 5B and is configured to couple the frame 104 to a concrete pad or platform (broadly, a base) (not shown). In particular, a plate 134 is coupled (e.g., welded) to the post 112 at welds 136 and includes a plurality of openings 138 (e.g., holes, slots, etc.). The openings 138 may receive fasteners (e.g., bolts, screws, etc.) to secure the post 112 (and more broadly, the frame 104) to the base. As shown in FIG. 5B, the plate 134 extends out from the mounting sides 120 the post 112, and not the cabinet-facing side 118 of the post 112, to allow the post 112 to be positioned more closely to the cabinet 102 (e.g., to allow the post 112 to be substantially flush with a sidewall 106 of the cabinet 102). In the illustrated embodiment, the plate 134 comprises a ¼" thick structural steel plate. It should be appreciated that the plate 134 may be formed from any suitable material within the scope of the present disclosure in addition to structural steel including, for example, metals other than structural steel such as iron, high-strength plastic, combinations thereof, etc. and these materials may be of the same or other suitable thicknesses.

The second end 122 of each post 112 also includes a plurality of notches 140 which serve as drainage holes. Because the assembly 100 is configured for deployment in an outdoor location (e.g., at an outdoor base) and the posts 112 in the illustrated embodiment are tubular, water may accumulate within the posts 112. To prevent such an accumulation of water within the posts 112, notches 140 are positioned at the second end 122 of the post 112 (e.g., towards the bottom of the post 112, where the plate 134 is coupled to the post 112, etc.) to facilitate drainage. In this illustrated embodiment, one notch 140 is positioned on each side of the post 112. In other embodiments, the post 112 may include a greater or lesser number of notches 140, positioned on one or more sides of the post 112.

Figure 6:
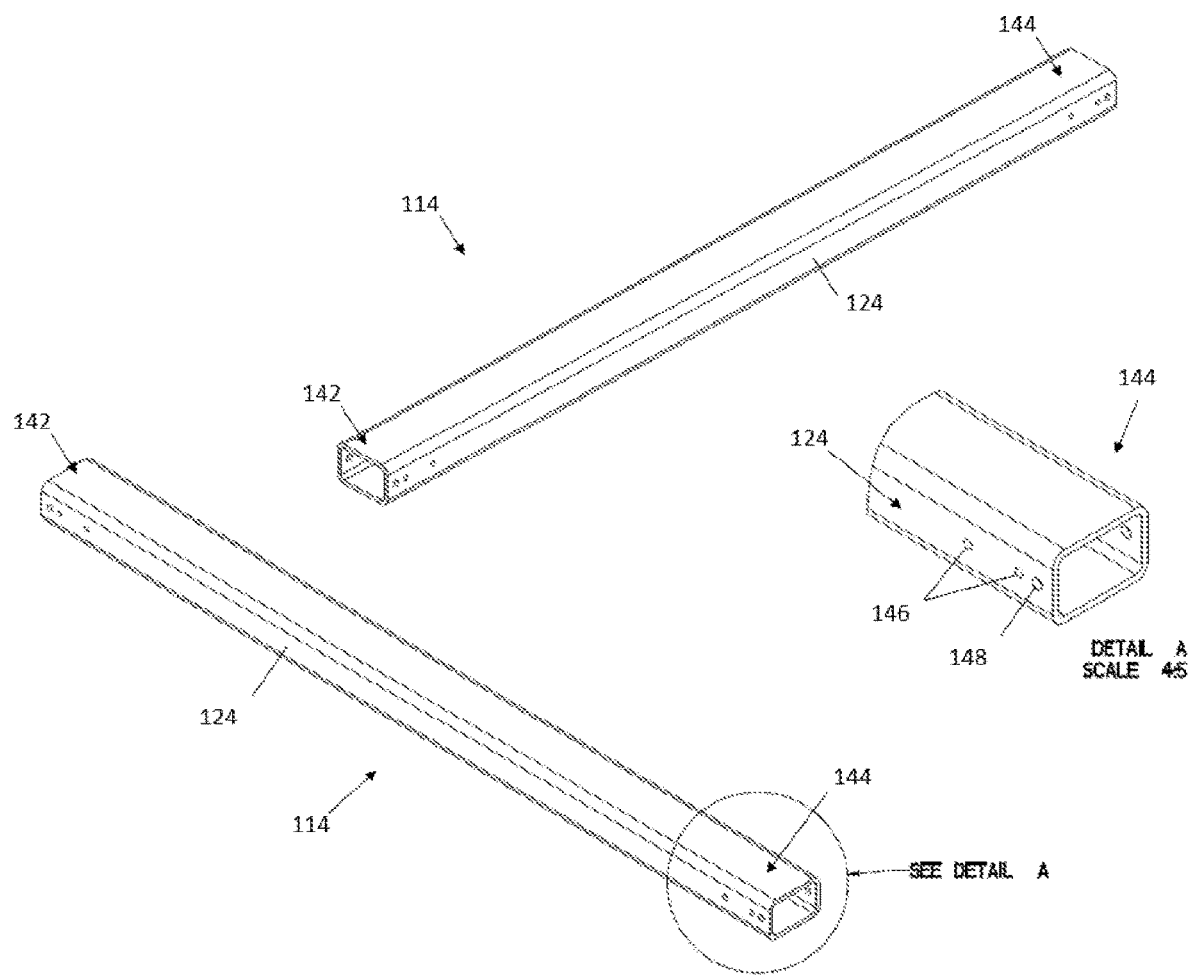
FIG. 6 is perspective views of a cross-member included in the frame of FIG. 3.

As shown in FIG. 6, the cross-member 114 of the frame 104 includes a first end 142 and a second end 144. Detail A illustrates one end (e.g., the second end 144) of the cross-member 114 in greater detail, however, the first end 142 and the second end 144 of the cross-member 114 are identical and include the same features. As shown in Detail A of FIG. 6, each end of the cross-member 114 includes a pair of connection points 146 on each mounting side 124 of the cross-member 114. One bracket 116 may be coupled to the cross-member 114 at each pair of connection points 146. In the illustrated embodiment, the connection points 146 are configured as openings (e.g., tapped holes) which are suitable to receive fasteners 132 (e.g., ¼"-20 bolts, etc.). Each end of the cross-member 114 further includes a paint line hole 148 positioned on each mounting side 124 of the cross-member. In the illustrated embodiment, the paint line holes 148 are positioned distally from the connection points 146 (e.g., towards the ends of the cross-member 114). It should be appreciated that the paint line hole 148 may be positioned on other sides of the post (e.g., the cabinet-facing side 122) and/or at different locations on the cross-member 114, within the scope of the present disclosure.

Figure 7:
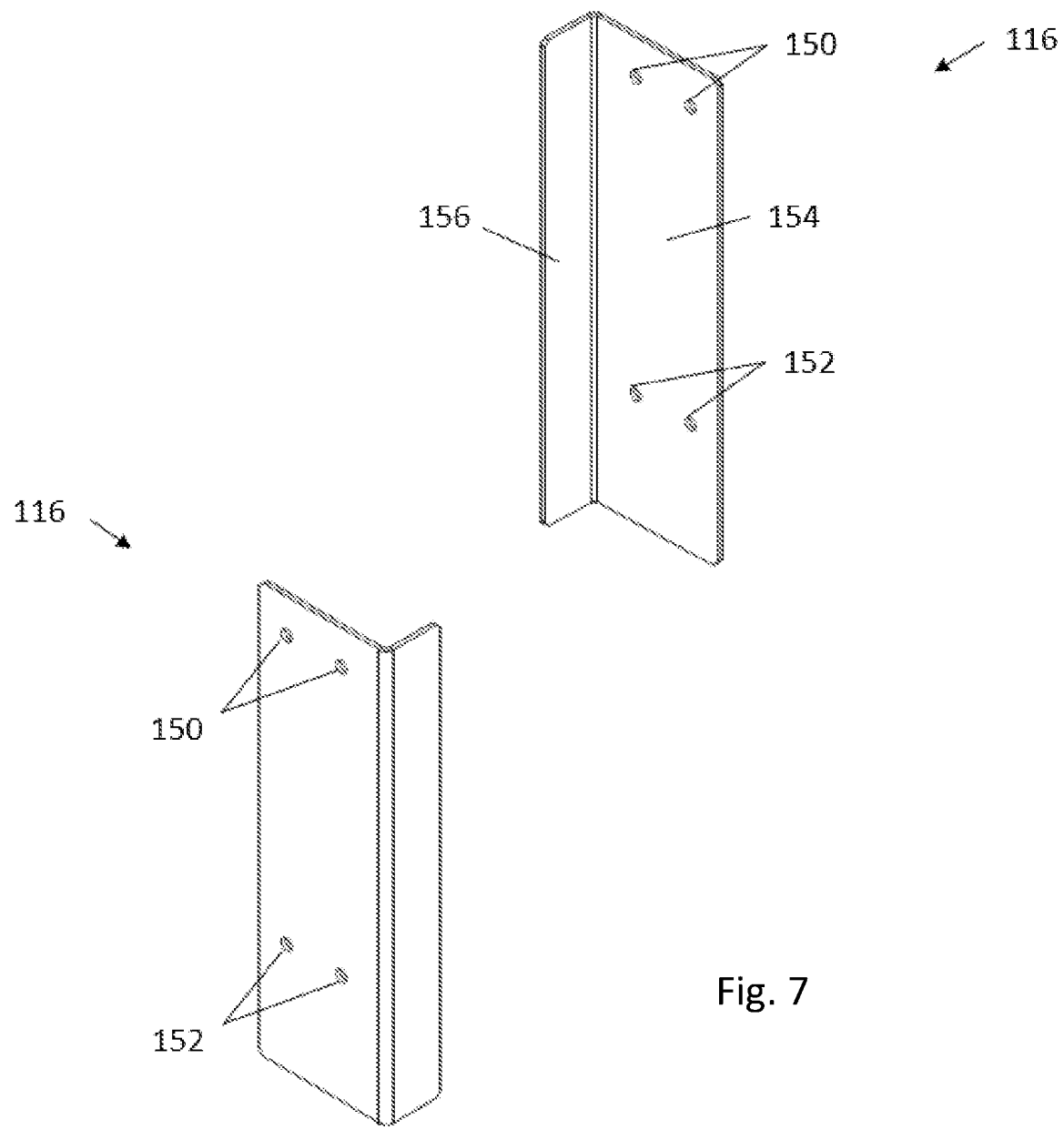
FIG. 7 is perspective views of a bracket included in the frame of FIG. 3.

In the illustrated embodiment, the brackets 116 couple (e.g., secure) the posts 112 to the cross-member 114. As shown in FIG. 7, each bracket includes two sets of connections points: a first set of connection points 150 which aligns with the connection points 146 on the cross-member 114 (e.g., when the bracket 116 is coupled to the cross-member 114) and a second set of connection points 152 which aligns with one set of connection points 130 on one of the posts 112 (e.g., when the bracket 116 is coupled to the post 112). Further, each bracket 116 includes a first surface 154 which faces the mounting side 124 of the cross-member 114 and the mounting side 120 of the post 112. The bracket 116 includes a second surface 156 which faces an end (e.g., the first end 142, the second end 144) of the cross-member 114 and a side of the post 112, which is opposite from the cabinet facing side 118.

In particular, as shown in FIG. 3, a pair of brackets 116 are coupled to the mounting sides 120 of each post 112 and to the mounting sides 124 of the cross-member, such that four brackets 116 are included to secure the cross-member 114 to the posts 112. As shown, the brackets 116 are coupled to the posts 112 and the cross-member 114 with fasteners 132 (e.g., screws, bolts, etc.). In other embodiments, the brackets 116 may be coupled to the posts 112 and the cross-member 114 in other manners, for example, via welding, friction fit, etc. In still other embodiments, the posts 112 may be directly coupled to the cross-members 114 (e.g., without brackets 116, etc.), for example, via welding.

In the illustrated embodiment, each of the brackets 116 are L brackets (e.g., include a generally "L"-shape geometry). The L-shape of brackets 116 may account for any tolerance build up in the installation process. It should be appreciated that a greater or lesser number of brackets 116, having a similar or different geometry, may be included in the frame 104 to connect the posts 112 to the cross-member 114 within the scope of the present disclosure. For example, each post 112 may include one bracket to couple the post 112 to the cross-member 114. Further, the bracket 116 may be formed from any suitable material within the scope of the present disclosure including, for example, metals such as steel (e.g., 11 GA steel), high-strength plastic, combinations thereof, etc.

Figure 8:
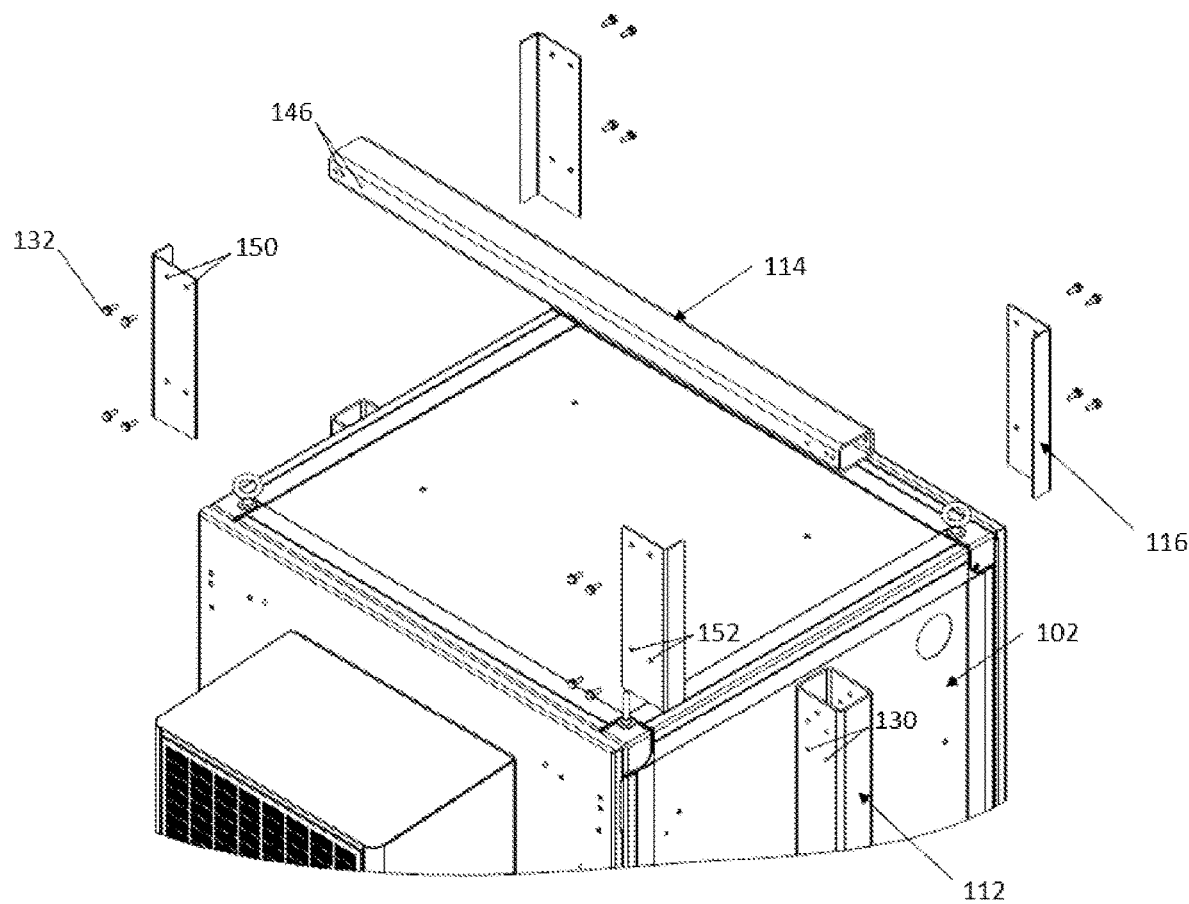
FIG. 8 is an exploded, perspective view of the assembly of FIG. 1.
Figure 9A:
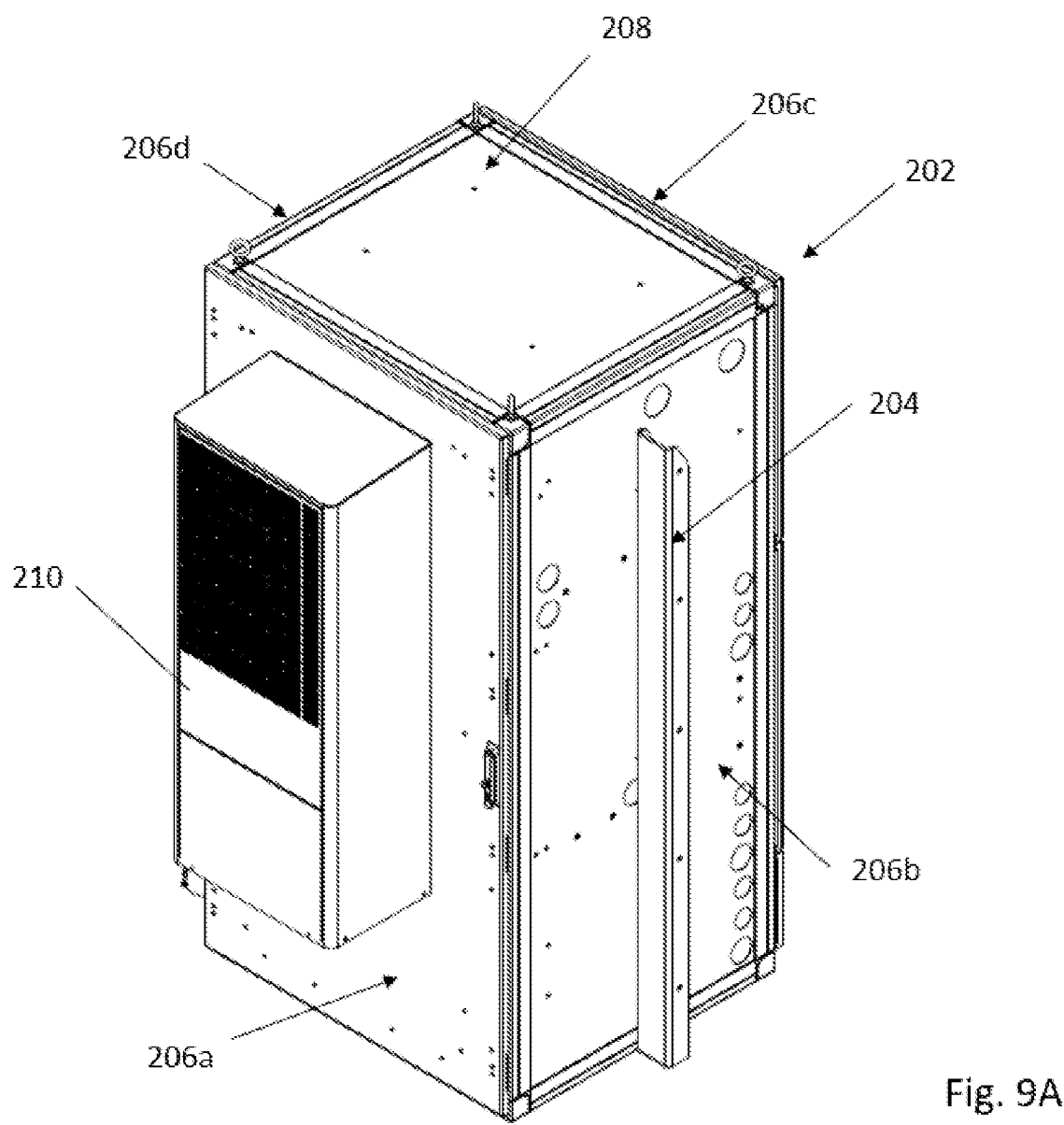
FIG. 9A is a perspective view of another example outdoor seismic cabinet assembly.
Figure 9B:
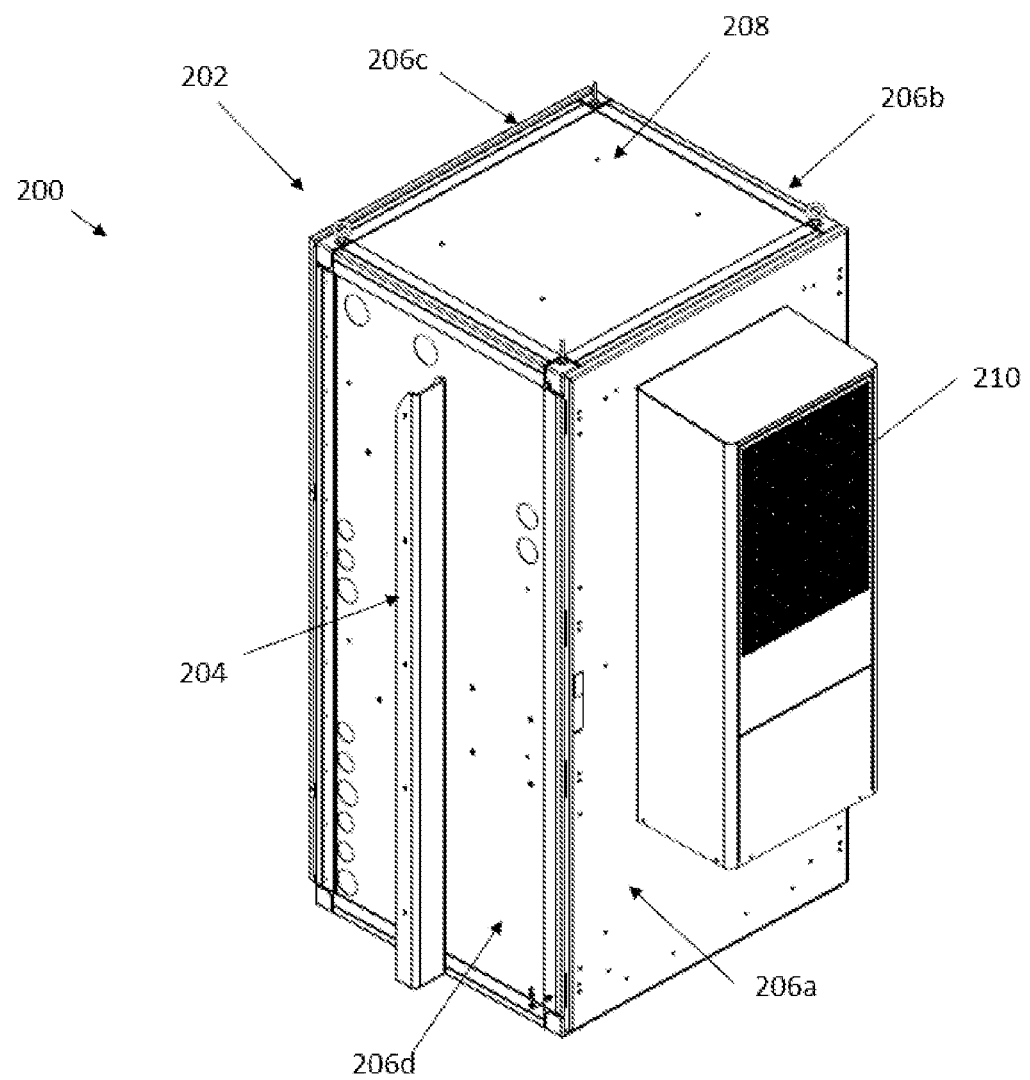
FIG. 9B is another perspective view of the assembly of FIG. 9A.

FIG. 8 illustrates an exploded view of the frame 104. As described above, the frame 104 may be positioned around the cabinet 102 (e.g., as deployed outdoors at a base, in the field, etc.) in order to seismically secure the cabinet 102 at the deployment site. In particular, the cross-member 114 is positioned on top of the cabinet 102 (e.g., flush with the top of the cabinet 102). A first post 112 is positioned adjacent to sidewall 106b of the cabinet 102 (e.g., flush with the sidewall 106b) and a second post 112 is positioned adjacent to sidewall 106d of the cabinet 102 (e.g., flush with the sidewall 106b). The cross-member 114 is secured to the first and second posts 112 by aligning the connection points 150 of the bracket 116 with the connection points 146 of the cross-member 114 and inserting fasteners 132 into the aligned connection points. Additionally, the connection points 152 of the bracket 116 are also aligned with one of the sets of connection points 130 of the post 112 and fasteners 132 are also inserted into these aligned connection points. This is repeated for all four brackets 116. After the brackets 116 are coupled to the cross-member 114 and the first and second posts 112 (or, alternatively, before the brackets 116 are coupled), the first and second posts 112 are coupled (e.g., secured) to the base (e.g., concrete pad or platform) upon which the cabinet 102 is deployed (e.g., in the field, etc.). In particular, fasteners (e.g., fasteners 132) are positioned through the openings 138 of the plate 134 positioned at the second end 128 of the post (see FIG. 5B).

In the illustrated embodiment, the posts 112 are positioned such that the posts 112 at least partially contact a sidewall 106 of the cabinet 102. However, the posts 112 (and broadly, the frame 104) are not directly secured to the cabinet 102 (e.g., are not fastened, welded, etc. to the cabinet 102). Rather, the posts 112 (and the frame 104) are coupled to the base (e.g., a concrete pad or platform) (not shown) upon which the cabinet 102 is installed (e.g., the cabinet 102 is coupled to the base, etc.). By securing the frame 104 to the same base upon which the cabinet 102 is installed, the frame 104 seismically secures the cabinet 102, thus allowing the cabinet 102 to comply with Zone 4 requirements.

Referring again to FIGS. 1 and 2, the assembly 100 includes only one frame 104 that partially surrounds the cabinet 102. It should be appreciated that the assembly 100 may include a greater number of frames (e.g., frame 104, frame 204 described below, another frame, any combination thereof, etc.) that at least partially surround the cabinet 102 based on the size and total weight of the cabinet 102 (and/or components included within the cabinet 102). As can be appreciated, larger cabinets with more weight and/or depth may require more than one frame (e.g., two frames, three frames, etc.) in order to meet certain seismic ratings (e.g., GR-487 Seismic Zone 4 requirements, etc.).

As described above, the frame 104 at least partially surrounds the cabinet 102 and may contact the cabinet without being directly coupled to the cabinet (e.g., without being fastened to the cabinet 102). As can be appreciated, installing the frame 104 without requiring any modification to an existing cabinet 102 installed in the field results in a simplified and efficient installation process to convert the cabinet 102 from a lower seismic rating to a higher seismic rating. For example, no internal manipulation or interfacing with the existing installed cabinet 102 is required to install the frame 102 and increase the seismic rating of the cabinet 102.

While the seismic frame 104 described above is not fastened to the cabinet 102, in some embodiments, a frame may be directly fastened to an existing cabinet that is installed in the field. FIGS. 9A-11 illustrate another example embodiment of an assembly 200 including one or more aspects of the present disclosure. In particular, the assembly includes a cabinet 202 and a frame 204 that is directly fastened to the cabinet 202. The cabinet 202 of this embodiment is similar to the cabinet 102 previously described and illustrated in FIGS. 1 and 2. For example, the cabinet 202 includes sidewalls 206, a top portion 208, and an optional air conditioner cooling system 210. Further, because the frame 204 is directly coupled to the cabinet 202, the cabinet 202 further includes a plurality of connection points 270 (e.g., sealed inserts, etc.).

By directly coupling a seismic frame (e.g., frame 204) to an existing cabinet (as opposed to coupling the frame and the cabinet to the same base), certain components included in frame 104 may be eliminated from the seismic frame 204 (e.g., top cross-members 114, brackets 116, etc.), based on the additional securement provided by the direct coupling of the seismic frame to the existing cabinet. Doing so may result in a lower cost seismic frame that is installable to an existing cabinet installed in the field with minimal interfacing with the existing cabinet (e.g., to secure the frame to the cabinet).

Figure 10:
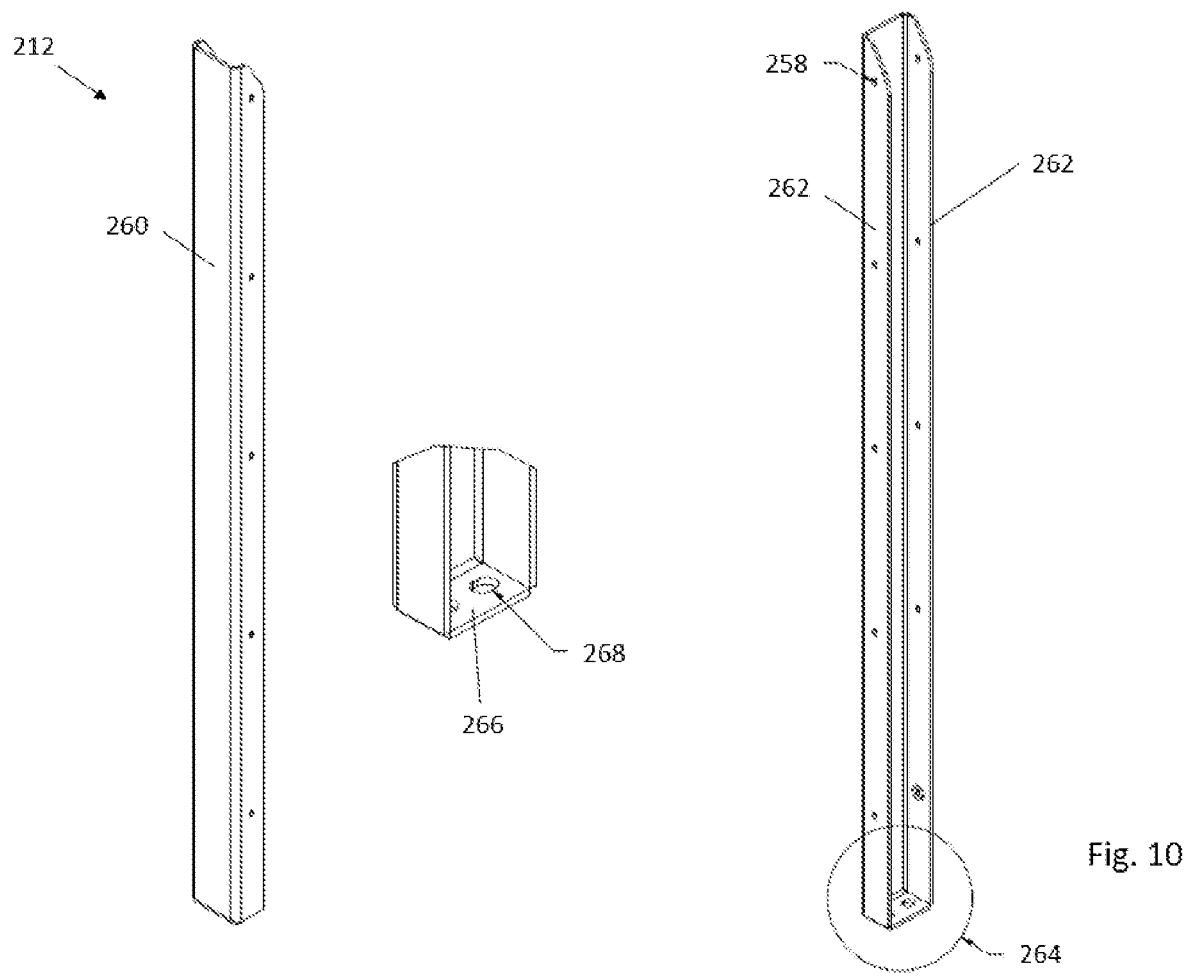
FIG. 10 is perspective views of a post included in the assembly of FIG. 9A.

In this example embodiment, the frame 204 is directly fastened to sidewalls 206 of the cabinet 202. In this embodiment, the frame 204 includes a pair of posts 212, however unlike frame 104, frame 204 does not include a top cross-member (e.g., cross-member 114). As shown in FIG. 10, posts 212 are configured as c-channels and include a web 260 and a pair of side surfaces 262 (e.g., flanges). The posts 212 include a plurality of connection points 258 (e.g., tapped holes, etc.) which are vertically spaced along the length of the post 212 and positioned on the side surfaces 262 of the post 212. In some embodiments, the connection points 258 are only included on one of the side surfaces 262 (e.g., the side of the post 212 adjacent the cabinet 202).

At an end 264 of the post 212, the post 212 includes a flange 266 for securement of the post 212 to the base (e.g., concrete pad, platform, etc.). The flange 266 extends from the end 262 of the post 212 and is secured (e.g., welded) to the side surfaces 262 of the post 212. The flange 266 includes a plurality of openings 268 (e.g., holes, slots, etc.). The openings 268 may receive fasteners (e.g., bolts, screws, etc.) to secure the post 212 (and more broadly, the frame 204) to the base.

Figure 11:
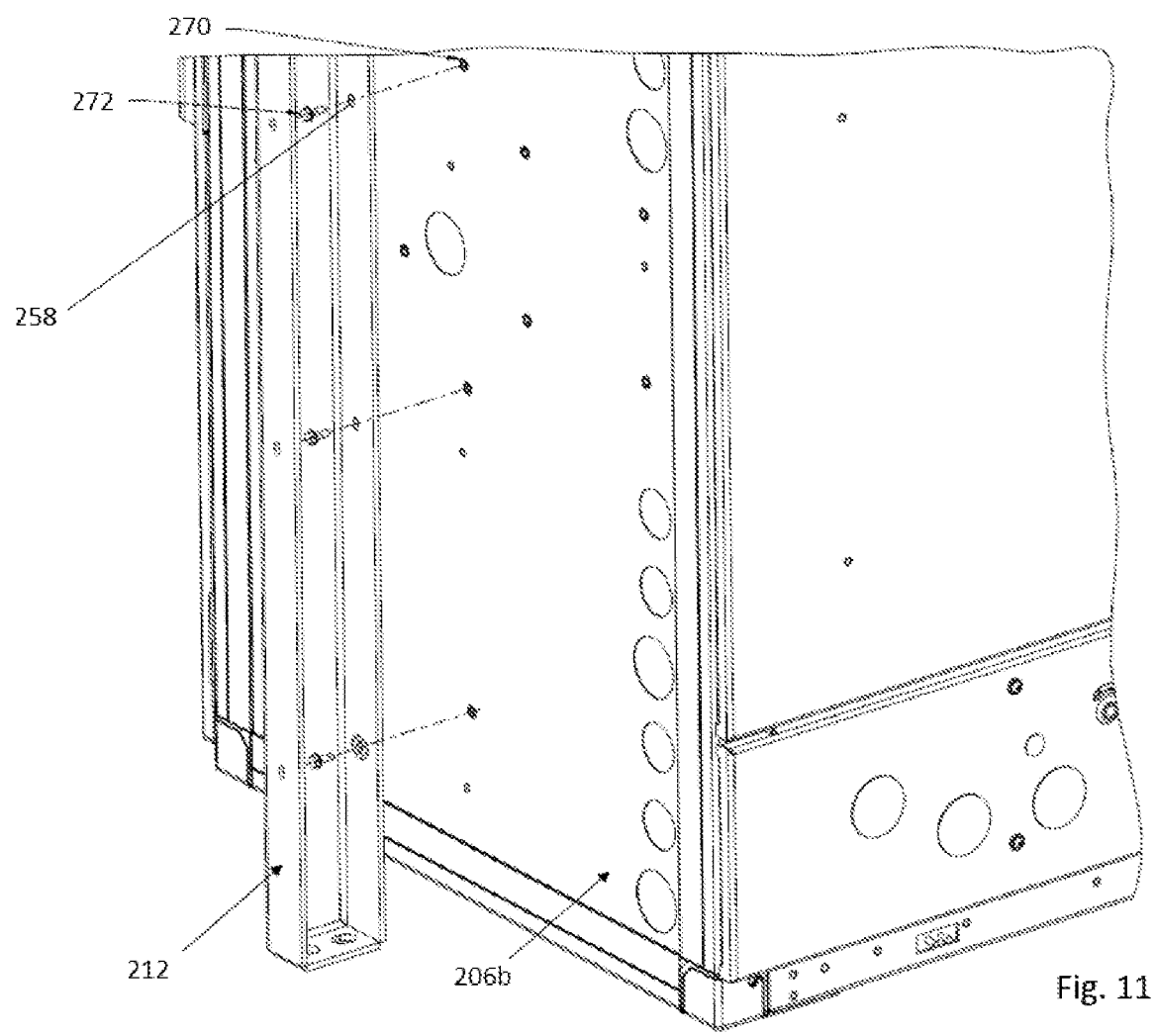
FIG. 11 is an exploded, perspective view of the assembly of FIG. 9A.

With reference to FIG. 11, a pair of the sidewalls 206 on opposing sides of the cabinet 202 (e.g., sidewalls 206b, 206d, etc.) include a plurality of vertically-spaced connection points 270 (e.g., tapped holes with sealed inserts) which are positioned to align with the connection points 258 of the posts 212. In particular, to couple the frame 204 to the cabinet 202, fasteners 272 (e.g., bolts, screws, etc.) are positioned through the connection points 258 on a mounting surface of the post 212 (e.g., the side surface 262 adjacent to the cabinet 202) and through the connection points 270 on the sidewall 206b of the cabinet 202. With the frame 204 coupled to the cabinet 202 and coupled to the base upon which the cabinet 202 is installed, the cabinet 202 complies with seismic requirements of areas having an elevated seismic rating such as GR-487 Zone 4.

Example embodiments described herein may facilitate use of a seismic frame with an existing field installed enclosure, such as an outdoor electronic equipment and/or battery cabinet, to increase the enclosure's seismic rating, which provides advantages over use of cabinets specifically designed for such higher seismic ratings (e.g., having internal frame weldments, etc.). For example, the seismic frame is able to be used with any existing cabinet, which allows cabinets designed for lower seismic requirement (e.g., GR-487 Zone 2) to be converted to meet higher Zone 4 requirements by simply adding a set of components in the field. The seismic frame allows simplified installation in the field, without requiring time-consuming, extensive rework or dis-assembly inside the cabinet. The ability to implement the seismic frame with any cabinet also allows a consumer to simplify the number of cabinet part numbers a consumer is required to manage (e.g., one cabinet can be used in any seismic zone).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An outdoor seismic cabinet assembly comprising:
a base located at an outdoor deployment location;
a cabinet for housing electronic equipment coupled to the base, the cabinet including a first sidewall, a second sidewall, and a top portion;
a first post disposed adjacent to the first sidewall of the cabinet, the first post including a first end, a second end, and at least one mounting surface, the first end of the first post coupled to the base, the at least one mounting surface of the first post including at least one connection point disposed at the second end of the first post;
a second post disposed adjacent to the second sidewall of the cabinet, the second post including a first end, a second end, and at least one mounting surface, the first end of the second post coupled to the base, the at least one mounting surface of the second post including at least one connection point disposed at the second end of the second post;
a cross-member disposed adjacent to the top portion of the cabinet, the cross-member including a first end, a second end, and at least one mounting surface, the at least one mounting surface of the cross-member including at least one first connection point disposed at the first end of the cross-member and at least one second connection point disposed at the second end of the cross-member;
at least one first bracket including a mounting surface, the at least one first bracket coupled to the first post at the at least one connection point of the first post and to the cross-member at the at least one first connection point, wherein the mounting surface of the at least one first bracket faces the at least one mounting surface of the first post and the at least one mounting surface of the cross-member; and
at least one second bracket including a mounting surface, the at least one second bracket coupled to the second post at the at least one connection point of the second post and to the cross-member at the at least one second connection point, wherein the mounting surface of the at least one second bracket faces the at least one mounting surface of the second post and the at least one mounting surface of the cross-member.

2. The assembly of claim 1, wherein the at least one mounting surface of the first post is perpendicular to the first sidewall of the cabinet; and
wherein the at least one mounting surface of the second post is perpendicular to the second sidewall of the cabinet.

3. The assembly of claim 1, wherein the cross-member extends beyond the top portion of the cabinet.

4. The assembly of claim 1, wherein the at least one connection point of the first post includes multiple connection points positioned vertically along a length of the first post; and
wherein the at least one connection point of the second post includes multiple connection points positioned vertically along a length of the second post, such that the height of the cross-member is adjustable via couplings of the at least one first connection point disposed at the first end of the cross-member and the at least one second connection point disposed at the second end of the cross-member with the at least one connection point of the first post and the at least one connection point of the second post.

5. The assembly of claim 1, further comprising:
a first plate coupled to the first end of the first post, wherein the first post is coupled to the base via the first plate; and
a second plate coupled to the first end of the second post, wherein the second post is coupled to the base via the second plate.

6. The assembly of claim 1, further comprising a plurality of fasteners;
wherein each connection point includes at least one hole and is configured to receive at least one of the plurality of fasteners.

7. The assembly of claim 1, wherein the first post includes at least one notch positioned at the first end of the first post to facilitate drainage; and
wherein the second post includes at least one notch positioned at the second end of the second post to facilitate drainage.

8. The assembly of claim 1, wherein the first post, the second post, and the cross-member each comprise a rectangular tube; and
wherein the first post and the second post are not coupled to the cabinet.

9. The assembly of claim 1, wherein the assembly satisfies GR-487 Seismic Zone 4 requirements of the deployment location.

10. The assembly of claim 1, wherein the at least one first bracket comprises a first pair of L-brackets and the at least one second bracket comprises a second pair of L-brackets.

* * * * *